Aug. 12, 1930.  A. H. CANDEE  1,772,585
METHOD OF HOBBING TAPERED GEARS
Filed April 9, 1928
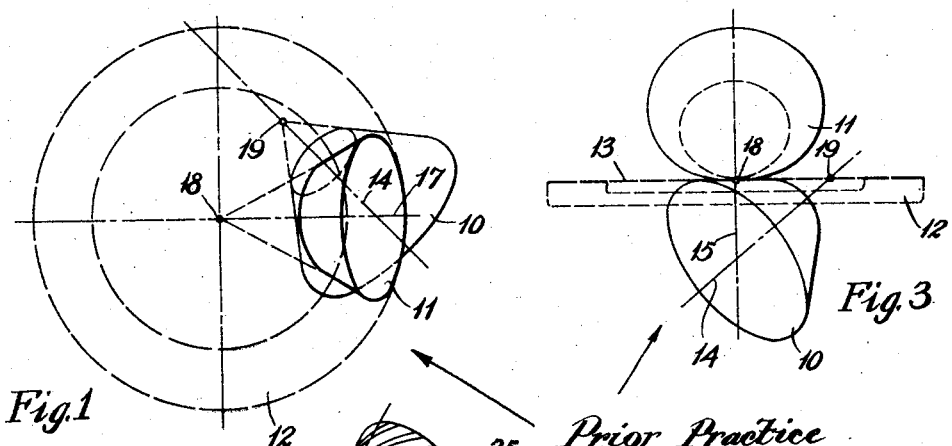
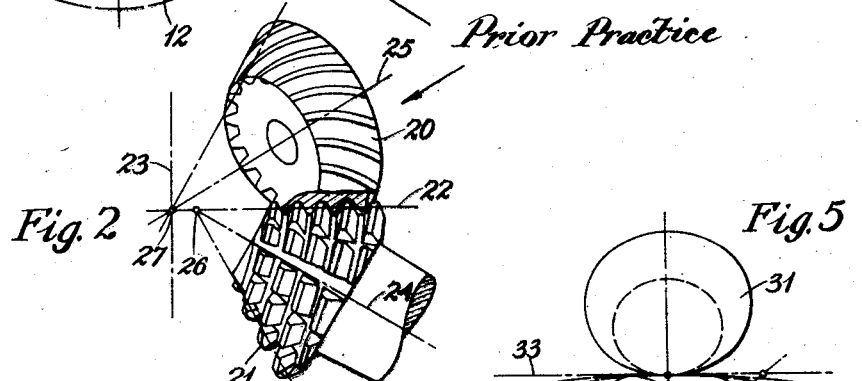
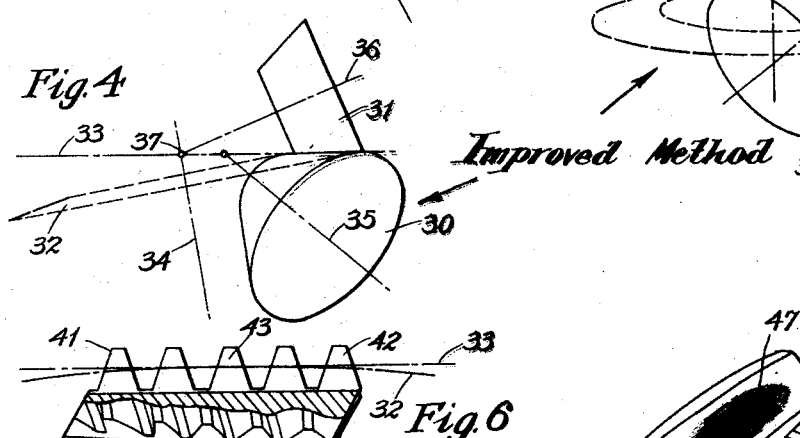
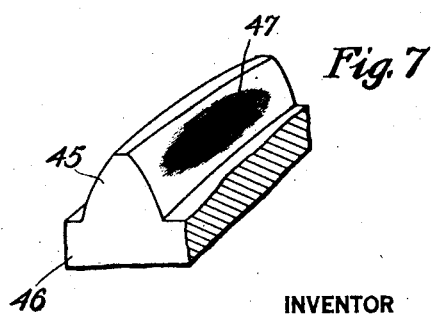
INVENTOR
Allan H. Candee
BY
F. Schlesinger
ATTORNEY Patented Aug. 12, 1930

1,772,585

UNITED STATES PATENT OFFICE

ALLAN H. CANDEE, OF ROCHESTER, NEW YORK, ASSIGNOR TO GLEASON WORKS, OF ROCHESTER, NEW YORK, A CORPORATION OF NEW YORK

METHOD OF HOBBING TAPERED GEARS

Application filed April 9, 1928. Serial No. 268,585.

The present invention relates to a method of hobbing tapered gears and especially to a method of generating spiral bevel gears in a hobbing operation.

Gears of the character described, as hobbed according to previous processes, have lacked adjustment, because by previous methods of hobbing, the mating tooth surfaces of a pair have matched each other along their whole length with the consequence that the gears have had a full length bearing, and must, therefore, be very accurately and very rigidly mounted. In this lack of adjustment hobbed spiral bevel gears have differed unfavorably from spiral bevel gears produced according to existing methods in which the teeth can be so cut that the tooth bearing between mating tooth surfaces can be concentrated at any point along the tooth surfaces thereby permitting the gears to accommodate themselves to unavoidable inaccuracies of mounting or to displacements under operating loads.

The primary object of this invention is to provide a method for hobbing tapered gears and particularly spiral bevel gears in which mating tooth surfaces of a pair can be cut to mismatch each other lengthwise and so have a tooth bearing which extends along a portion of the length of the teeth only, disappearing toward the ends. With the present invention, therefore, tapered gears can be hobbed, which can be more readily assembled and which are more dependable under the conditions which actually exist during operation than tapered gears hobbed according to any previous process.

With the present invention instead of generating the gears of a pair conjugate to basic crown gears, as has heretofore been the practise, one or both members of a pair are generated conjugate to basic generating gears having conical pitch surfaces, that is, basic generating gears of other than 90° pitch cone angle. By the present method, the exact conjugacy and matching of mating tooth surfaces of the two members of a pair, which is characteristic of gears generated conjugate to true crown gears, is avoided and the mating gears are provided with tooth surfaces which mismatch each other lengthwise. The present invention is particularly applicable to the generation of spiral bevel gears with a tapered hob of constant pitch in axial section. Employing the present invention in generating gears with a hob of this type, instead of producing a gear having teeth and tooth spaces of uniform depth and uniform normal thickness in development, as heretofore, a gear will be produced having teeth which are of less thickness at their ends than at their centers so that when this gear meshes with a mate gear, the tooth bearing will be localized near the centers of the mating teeth.

In the drawings:

Figures 1 and 3 are a plan view and an end elevation, respectively, illustrating diagrammatically the method heretofore employed of generating spiral bevel gears in a hobbing process;

Figure 2 is a side elevation showing a taper hob of constant axial pitch in mesh with a bevel gear blank during the generation of a gear according to one process heretofore practised;

Figures 4 and 5 are a side elevation and plan view, respectively, illustrating the improved method of generating spiral bevel gears constituting one embodiment of the present invention;

Figure 6 is an enlarged view of a taper hob of constant pitch and illustrating by way of comparison the action of this hob when representing a basic generating crown gear according to previous practise and when representing a conical generating gear as in the method of the present invention; and Figure 7 is a side elevation of a tooth of a spiral bevel gear produced according to this invention, showing how the tooth bearing may be localized.

Heretofore it has been the practise in hobbing spiral bevel gears to generate the gears conjugate to a basic crown gear represented by the hob. This practise is illustrated in Figs. 1 and 3 in connection with the hobbing of a bevel gear with a taper hob. The pitch surfaces of the hob, bevel gear and basic generating crown gear only are shown. 10 indicates the hob which is of taper or conical form. 11 designates the bevel gear blank to be generated. The imaginary basic generating crown gear which the hob represents is shown in dotted lines at 12. This imaginary basic generating crown gear has a plane pitch surface 13; that is, its pitch cone angle is 90°.

To generate the gear 11, the hob 10 is so positioned relative to the blank as to represent the imaginary crown gear 12, its pitch surface being tangent to the pitch plane 13 of this imaginary basic generating gear, and the position of its apex 19 and the offset of its axis 14 from the axis 15 of the basic generating gear being determined by the structure of the hob and basic generating gear, as well known in the art. The bevel gear blank 11 is positioned so that its axis 17 intersects the axis 15 of the imaginary generating crown gear 12 in the blank apex 18. With the hob 10 and gear blank 11 in engagement, the hob and blank will be rotated continuously on their respective axes 14 and 17 and simultaneously a continuous relative rolling motion will be produced between the hob and blank about the axis 15 of the imaginary generating crown gear 12, thereby to generate tooth surfaces on the blank conjugate to the imaginary generating crown gear.

Figure 2 shows one application of this process to the generation of a spiral bevel gear 20 with a taper hob 21 of constant axial pitch. The pitch plane of the imaginary basic generating crown gear represented by the hob is designated at 22 and the axis of this crown gear at 23. 24 and 25 designate, respectively, the axes of hob and gear blank, while 26 and 27 designate, respectively, their respective apexes. In the generation of the gear 20, the hob 21 and blank 20 are rotated continuously on their respective axes and simultaneously a continuous relative rolling movement is produced between the hob and blank about the axis 23 of the basic generating crown gear represented by the hob.

According to previous methods, both members of a pair of spiral bevel gears will be generated by the same process. The two members of a pair hence are exactly conjugate in the pitch plane 13 or 22 of the basic generating crown gear and the teeth of the two gears will match each other exactly along their full length. For this reason, the gears will lack adjustment in mesh.

Figures 4 and 5 illustrate the method of hobbing according to the present invention. Here one or both members of the pair is or are generated by rolling a hob and a gear blank relatively to each other as though the gear being hobbed were meshing with a basic generating gear having a conical pitch surface, that is, a pitch cone angle of less than 90°. The hob, which may be of the same construction as the hobs employed in any of the previous processes, is indicated at 30. The hob is so adjusted relative to the gear blank 31 that it represents an imaginary conical generating gear 32. The pitch surfaces of the blank and of the basic generating gear 32 represented by the hob 30 will be tangent to the plane 33 when the hob has been fed into full depth. The axis of the imaginary basic generating gear, which is represented by the axis of the cradle in a machine for practising this invention is designated at 34. For generating the teeth of the gear, the hob and blank are rotated continuously in mesh about their respective axes 35 and 36 and simultaneously a continuous relative rolling movement is produced between the hob and blank about the axis 34 of the imaginary generating gear 32 represented by the hob.

Figure 6 shows on a large scale, a taper hob of constant pitch such as may be employed in practising this invention. This hob may be of the same construction as the hob 21 of Fig. 2.

Where the hob represents, as illustrated in Figs. 1 to 3, a basic generating gear having a plane pitch surface, the pitch surface of the hob will be tangent to the pitch plane of the generating crown gear along a straight line and during the rolling motion between the hob and blank, the teeth of the blank will be cut to their full depth. When both members of a pair of gears are generated in this fashion, their mating tooth surfaces will match each other as already stated, exactly along their whole length. Where, however, as with the present invention, the hob represents a conical generating gear, the pitch cone of the hob will contact with the conical pitch surface 32 of the generating gear only in a point, as illustrated in Figs. 4, 5 and 6 since the axes of the pitch cones of the hob and the generating gear are not in the same plane. In both directions away from the point of tangency the hob will extend further beyond the pitch surface 32 of the generating gear and so will cut to a greater depth. Thus, as clearly shown in Fig. 6, the teeth 41 and 42 towards the two ends of the hob cut progressively deeper than the tooth 43 located centrally of the length of the hob.

Since the teeth of the hob increase in width from their outer ends to their roots, as will be seen in Fig. 6, it will be clear that with the process of the present invention the teeth of the gear blank being generated will be cut thinner at their ends than at their centers. The effect of this is illustrated in Fig. 7 where a tooth 45 of a spiral bevel gear 46 produced according to this invention is shown. This tooth is thinner at its outer and its inner ends than at its center and the grooves of the gear will be correspondingly wider at their ends than at their centers. The mate gear may be generated according to methods heretofore employed or in the same fashion as the gear 46. In either event, the contact between the mating tooth surfaces of the two gears when in mesh will occur at the centers of the teeth and the bearing will disappear gradually toward the ends of the teeth. The gears will have in mesh, therefore, a concentrated or localized bearing as indicated by the shaded surface 47 in Fig. 7. The present invention permits, therefore, of producing gears capable of accommodating themselves to the varying conditions of loads and mountings which occur in practice.

In Figs. 4 and 5, the blank axis 36 is shown intersecting the basic generating gear axis 34 in the blank apex 37. Since the blank is rolled on a conical generating gear, the teeth of the blank will have a so-called bias bearing, that is, a tooth bearing extending diagonally of the tooth surface. This bias bearing may be eliminated by offsetting the blank apex 27 or blank axis 36, during cutting, from the generating gear axis 34, as in the method described in the copending application of the present inventor and Ernest Wildhaber, Serial No. 113,550, filed June 3, 1926.

By varying the position of the hob, the bearing can be concentrated anywhere along the face of the gear teeth.

While the invention has been illustrated in connection with the hobbing of spiral bevel gears with a taper hob of constant axial pitch, it will be understood that it is applicable to the production of other forms of taper gears and with other forms of hobs. In general, it may be said that the invention is capable of various further modifications, adaptations, and uses within its scope and that this application is intended to cover any adaptations, uses, or embodiments following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. The method of hobbing a tapered gear which consists in positioning a worm hob and a tapered gear blank in engagement, with the axis of the hob angularly disposed to and offset from the axis of the blank, rotating the hob and blank continuously in engagement and simultaneously producing a relative rolling movement between the hob and blank corresponding to that of a gear rolling with a conical generating gear of other than 90° cone angle, thereby to produce teeth on the gear blank of less thickness at their ends than at their centers.

2. The method of hobbing a tapered gear which consists in positioning a taper hob and a gear blank in engagement, with the axis of the hob angularly disposed to and offset from the axis of the blank, rotating the hob and blank continuously in engagement and simultaneously producing a relative rolling movement between the hob and blank corresponding to that of a gear rolling with a conical generating gear of other than 90° cone angle, thereby to cut teeth on the gear blank of less thickness at their ends than at their centers.

3. The method of hobbing a tapered gear which consists in positioning a taper hob of constant pitch and a gear blank in engagement, with the axis of the hob angularly disposed to and offset from the axis of the blank, rotating the hob and blank continuously in engagement and simultaneously producing a relative rolling movement between the hob and blank corresponding to that of a gear rolling with a conical generating gear of other than 90° cone angle, thereby to cut teeth on the gear blank of less thickness at their ends than at their centers.

4. The method of hobbing a tapered gear which consists in positioning a taper hob of constant pitch in axial section and a gear blank in engagement, with the axis of the hob angularly disposed to and offset from the axis of the blank, rotating the hob and blank continuously in engagement and simultaneously producing a relative rolling movement between the hob and blank corresponding to that of a gear rolling with a conical generating gear of other than 90° cone angle, thereby to produce teeth on the gear blank of less thickness at their ends than at their centers.

5. The method of hobbing a tapered gear which consists in positioning a worm hob and a gear blank in engagement, with the axis of the hob angularly disposed to and offset from the axis of the blank, rotating the hob and blank continuously in engagement and simultaneously producing a relative rolling movement between the hob and blank corresponding to that of a gear rolling with a conical generating gear of other than 90° cone angle, while maintaining the apex of the blank offset from the axis of the basic generating gear.

6. The method of hobbing a tapered gear which consists in positioning a taper hob and a gear blank in engagement, with the axis of the hob angularly disposed to and offset from the axis of the blank, rotating the hob and blank continuously in engagement and simultaneously producing a relative rolling movement between the hob and blank corresponding to that of a gear rolling with a conical generating gear of other than 90° cone angle while maintaining the apex of the blank offset from the axis of the basic generating gear.

7. The method of hobbing a tapered gear which consists in positioning a taper hob of constant pitch in axial section and a gear blank in engagement, with the axis of the hob angularly disposed to and offset from the axis of the blank, rotating the hob and blank continuously in engagement and simultaneously producing a relative rolling movement between the hob and blank corresponding to that of a gear rolling with a conical generating gear of other than 90° cone angle while maintaining the apex of the blank offset from the axis of the basic generating gear.

8. The method of producing a pair of tapered gears which consists in cutting each member of the pair by positioning a worm hob and a tapered gear blank in engagement, with the axis of the hob angularly disposed to and offset from the axis of the blank, rotating the hob and blank continuously in engagement and simultaneously producing a relative rolling movement between the hob and blank corresponding to that of a gear rolling with a conical generating gear of other than 90° pitch cone angle.

9. The method of producing a pair of tapered gears which consists in cutting each member of the pair by positioning a taper hob and a gear blank in engagement, with the axis of the hob angularly disposed to and offset from the axis of the blank, rotating the hob and blank continuously in engagement and simultaneously producing a relative rolling movement between the hob and blank corresponding to that of a gear rolling with a conical generating gear of other than 90° pitch cone angle.

10. The method of producing a pair of tapered gears which consists in cutting each member of the pair by positioning a taper hob of constant axial pitch and a gear blank in engagement, with the axis of the hob angularly disposed to and offset from the axis of the blank, rotating the hob and blank continuously in engagement and simultaneously producing a relative rolling movement between the hob and blank corresponding to that of a a gear rolling with a conical generating gear of other than 90° pitch cone angle.

11. The method of generating a bevel gear by means of a hob having its cutting teeth arranged in a helical thread which consists in positioning and moving the hob and gear blank relatively to each other as to cause the hob to represent an imaginary generating gear having a pitch cone angle of slightly less than 90° and generate tooth surfaces on the blank conjugate to such imaginary generating gear.

ALLAN H. CANDEE.